United States Patent
Tobey et al.

[15] 3,694,513
[45] Sept. 26, 1972

[54] DIRECT NITRATION OF ALKYLPHENOLS WITH NITRIC ACID

[72] Inventors: Stephen W. Tobey, Sudbury, Mass. 01776; Marilyn Z. Lourandos, Ashland, Mass. 01721

[73] Assignee: The Dow Chemical Company, Midland, Mich.

[22] Filed: June 8, 1970

[21] Appl. No.: 44,666

[52] U.S. Cl. ............................................. 260/622 R
[51] Int. Cl. ............................................. C07c 79/24
[58] Field of Search ................................. 260/622 R

[56] References Cited

UNITED STATES PATENTS

| | | |
|---|---|---|
| 2,868,844 | 1/1959 | Coffield et al. .........260/622 R |
| 2,802,883 | 8/1957 | Dietzler ..................260/622 R |
| 3,557,159 | 1/1971 | Gruber ...................260/622 R |

FOREIGN PATENTS OR APPLICATIONS

| | | |
|---|---|---|
| 1,294,254 | 4/1962 | France ....................260/622 R |
| 1,142,300 | 2/1969 | Great Britain .........260/622 R |

OTHER PUBLICATIONS

Arnall, J. Chem. Soc., (1924) 125 pp. 811– 816 QDIC6

Primary Examiner—Howard T. Mars
Attorney—Griswold & Burdick, Herbert D. Knudsen and C. E. Rehberg

[57] ABSTRACT

Alkylphenols are nitrated with nitric acid in the presence of a secondary or tertiary alcohol, a secondary alkyl nitrate, an aldehyde or a ketone. Use of such inhibitor decreases the quantity of oxidation products formed, especially quinone formation, and increases the conversion of the starting phenols to the desired nitrated products.

8 Claims, No Drawings

DIRECT NITRATION OF ALKYLPHENOLS WITH NITRIC ACID

BACKGROUND OF THE INVENTION

The direct nitration of alkylated phenols has been avoided because of the competitive formation of oxidation byproducts. Such oxidation has been traditionally circumvented by first sulfonating the phenol compound and then reacting the product of such sulfonation with nitric acid to replace the sulfonic acid group with the nitro group. A number of techniques for such treatment are well known and are exemplified by Urbanski in Chemistry and Technology of Explosives, Vol. 1, Pergamon Press, New York, 1964.

Dietzler in U.S. Pat. No. 2,802,883 teaches the direct nitration of t-alkylphenols in carbon tetrachloride or perchloroethylene. These reactions were conducted at temperatures of about 0° to about 75° C. by adding the alkylphenol solution dropwise into nitric acid.

SUMMARY OF THE INVENTION

According to the present invention, alkylphenols are nitrated with nitric acid in the presence of a secondary or tertiary alcohol, a secondary alkyl nitrate, an aldehyde, a ketone or mixture thereof. The use of such inhibitor reduces the amount of undesirable oxidation by-products, especially quinone formation, and increases the conversion to the desired nitrated product.

The important and novel feature of the present invention is conducting the direct nitration in the presence of a secondary or tertiary alcohol, a secondary alkyl nitrate, an aldehyde, a ketone or mixture thereof. These inhibitors must be soluble in the reaction medium at reaction temperature and may be employed in widely varying concentrations. Representative examples of suitable inhibitors include: secondary alkanols, such as 2-propanol, 2-butanol, 2-pentanol, 3-hexanol, cyclohexanol, 3-decanol, 4-dodecanol and 2-octanol; tertiary alkanols, such as t-butyl alcohol, t-amyl alcohol and 3-ethyl-3-hexanol; secondary alkyl nitrates such as isopropyl nitrate, 2-butyl nitrate, 3-pentyl nitrate, 2-dodecyl nitrate and 2-heptyl nitrate; alkanals such as acetaldehyde, pentanal and undecanal; alkanones such as acetone, 2-butanone, 3-pentanone, 2,2,-dimethyl-3-butanone, 4-nonanone and 5-undecanone. Inhibitors are not more than eight carbon atoms are preferred, with 2-propanol, 2-butanol, isopropyl nitrate and acetone being especially preferred, and 2-propanol being of special interest.

The concentration of the inhibitor in the reaction may vary widely as different inhibitors, reactants and conditions are employed. Essentially any concentration which gives a significant reduction in the amount of byproducts formed in the reaction may suitably be employed. Preferably concentrations of about 2 to about 30 mole percent of the inhibitor, based on the alkylphenol, are used, with concentrations of 5 to 15 mole percent being especially preferred. Above concentrations of 30 mole percent, the nitric acid is inefficiently employed because of the side reaction with the inhibitor and below concentrations of about 2 percent, the reduction in the byproducts formed is substantially diminished.

The alkylphenols that may be nitrated in the present invention are suitably those phenols containing one or two alkyl groups of one to about 10 or more carbon atoms. Although the alkyl groups are usually in the ortho or para position, they may also be in the meta position. Representative examples of suitable mono-alkylphenols include o, p or m-, methyl-, ethyl-, propyl-, isopropyl-, n-butyl-, sec-butyl-, t-butyl-, n-pentyl-, n-hexyl-, isohexyl- cyclohexyl- and nonyl- phenol. Representative examples of dialkylphenols include 2,6-dimethylphenol, 2,4-diethylphenol, 3,4-di-t-butylphenol and 2,6-dioctylphenol. Alkylphenols having alkyl groups of 1 to 4 carbon atoms are preferred, with monoalkylphenols being especially preferred, and the nitration of o-sec-butylphenol being of special interest.

The concentration of the nitric acid may suitably range from about 20 weight percent to fuming nitric acid, with 60 percent to 90 percent nitric acid being preferred. Usually a molar excess of nitric acid based on the alkylphenol is employed to insure the desired degree of nitration. For example, if dinitration is desired, about 2.5 to about 4 moles of nitric acid are employed per mole of the alkylphenol. As more nitro groups are added onto the aromatic ring, longer reaction times and more nitric acid, of course, are required. Especially preferred in the present invention is dinitration of ortho and para alkylphenols, and the reaction of special interest is the dinitration of o-sec-butylphenol to form 4,6-dinitro-o-sec-butylphenol.

In addition to the reactants and the inhibitor, an inert solvent or diluent may also be used in the reaction. Any solvent inert to the reaction conditions may suitably be employed. Representative examples of solvents include chlorinated aliphatic hydrocarbons, such as carbon tetrachloride and perchloroethylene, hexane, ligroin and excess product. In the dinitration of a o-sec-butylphenol, using the product as a solvent gives especially good results.

The temperature of the reaction may vary widely so long as the liquid phase is maintained. Preferred temperatures are about 10° to about 85° C. or more, with temperatures of 40° to 75° C. being especially preferred. Since the reaction is exothermic, cooling is usually required. At these temperatures, the reaction time may vary widely depending upon the alkylphenol nitrated, the degree of nitration desired, the strength of the nitric acid and the nature and amount of inhibitor employed. Under the conditions of the specific embodiments, the reaction is usually complete in less than an hour and, in most instances, less than 30 minutes.

The process of the present invention is easily conducted in a batch process, or it is readily adapted to a continuous operation. In a continuous operation, a mixture of the alkylphenol and inhibitor, for example, ortho secondary butyl phenol and 2-propanol, is continuously fed into a reactor, and simultaneously, concentrated aqueous nitric acid is fed into the reactor from a separate source. The reactants are maintained at reaction temperature for the desired time with stirring and at the termination of the reaction, the nitric product is isolated from the organic layer by conventional means.

SPECIFIC EMBODIMENTS

Examples 1–4 and Comparative Example A

In parallel experiments, 10 ml. of 70% $HNO_3$ (158 millimoles), 7.5 ml. of carbon tetrachloride and 240 mg. of each inhibitor tested were placed in a reactor. With vigorous stirring, 2.5 ml. (16.2 millimoles) of o-sec-butylphenol, hereinafter OSBP, diluted with 10 ml. of carbon tetrachloride was added over 5 minutes. During the addition, nitrogen oxides were evolved and the reaction temperature increased from room temperature to about 45° C. After the addition was terminated, stirring was continued for 5 minutes and the carbon tetrachloride layer was washed three times with water, dried over Na$_2$SO$_4$ and solvent was removed under vacuum. The product was analyzed for sec-butylquinone, hereinafter SBQ, the undesirable byproduct formed by oxidation of the phenol, by infrared analysis. The results of the inhibited runs showing the mole percent SBQ in the dinitro-o-sec-butylphenol, hereinafter DNOSBP, compared to a run without inhibitor are shown in Table I. The inhibited runs show beneficial reduction of SBQ.

TABLE I

Inhibited Direct Nitration of OSBP in Carbon Tetrachloride

| Example | Inhibitor | Mole % SBQ in DNOSBP |
|---|---|---|
| Comp. A | None | 7.9 |
| 1 | t-butanol | 7.0 |
| 2 | acetone | 6.4 |
| 3 | 2-butanone | 6.2 |
| 4 | 2-propanol | 5.5 |

Examples 5–8 and Comparative Example B

In the same manner as shown by Examples 1–4 except that cyclohexane was used as the solvent in place of carbon tetrachloride, parallel experiments were conducted to determine the effect of the inhibitors in another solvent system. The results of these tests are shown in Table II.

TABLE II

Inhibited Direct Nitration of OSBP in Cyclohexane

| Example | Inhibitor | Mole % SBQ in DNOSBP |
|---|---|---|
| Comp. B | None | 7.6 |
| 5 | acetaldehyde | 6.8 |
| 6 | acetone | 5.6 |
| 7 | 2-propanol | 5.2 |
| 8 | 1:1 acetone-2-propanol | 5.6 |

Examples 9–20 and Comparative Example C

In parallel experiments conducted in a manner similar to Examples 1–4, 2.5 g. (16.7 millimoles) of OSBP were reacted with 4.18 g. (59.8 millimoles) of 90% HNO$_3$ using 7.5 ml. of ligroin as a solvent for each reactant. The effect of various concentrations of different inhibitors is shown in Table III.

TABLE III

Effect of Inhibitor Concentrations on the Direct Nitration of OSBP in Ligroin

| Example | Inhibitor | Concentration Moles Inh./Moles OSBP | Mole % SBQ in DNOSBP |
|---|---|---|---|
| Comp. C | | 0 | 9.9 |
| 9 | acetone | 0.041 | 7.5 |
| 10 | " | 0.098 | 7.2 |
| 11 | " | 0.134 | 6.5 |
| 12 | " | 0.185 | 5.7 |
| 13 | 2-propanol | 0.045 | 8.7 |
| 14 | " | 0.139 | 6.7 |
| 15 | " | 0.182 | 6.4 |
| 16 | 2-butanol | 0.093 | 8.4 |
| 17 | 37 | 0.143 | 7.0 |
| 18 | " | 0.218 | 6.9 |
| 19 | isopropyl nitrate | 0.058 | 7.3 |
| 20 | " | 0.110 | 7.3 |

Example 21

On a larger scale, using more inhibitor, 100 ml. of 70% HNO$_3$ (1.60 moles) and 75 ml. of cyclohexane were placed in a reactor, and a solution of 24.5 g. (0.163 mole) of OSBP and 2.6 g. (0.043 mole, 26 mole percent based on the OSBP) of 2-propanol in 75 ml. of cyclohexane was added with stirring over 12 minutes. During the addition, the reaction temperature rose to 65° C. from room temperature. An 86.2 percent yield of the DNOSBP based on the OSBP was isolated, and the concentration of SBQ was analyzed to be 4.7 mole percent based on the DNOSBP.

Example 22

In the absence of a solvent, parallel experiments were conducted to determine the effect of inhibitor. A reaction was charged with 17.0 ml. of 70% HNO$_3$, and 10.25 g. of OSBP was added over 12 minutes. The exothermic reaction rapidly heated the reaction mixture to 45° C. and the reaction mixture was maintained at 45±3° C. with cooling. Without inhibitor 8.5 mole percent of SBQ was obtained, but with 6.5 mole percent 2-propanol based on the OSBP the SBQ was reduced to 4.9 mole percent.

Example 23

Using DNOSBP as a solvent, 8.35 g. (0.1192 mole) of 90% HNO$_3$ and 3.25 g. DNOSBP containing 3.6 moles percent SBQ were charged to a reactor. Then 4.94 g. (0.0329 mole) of OSBP and 0.09 g. (0.0015 mole) of 2-propanol in 9.76 g. DNOSBP was added over 20 minutes. During the addition and for 18 minutes thereafter the temperature was maintained at 47±3° C. After washing the organic layer twice with water, the DNOSBP product was isolated to give a 85.7 percent yield of the theoretical. Analysis of the product showed 3.4 mole percent SBQ in the DNOSBP.

Example 24

The effect of continuous conditions in the nitration of OSBP was observed in a reactor having two inlets: one for introduction of OSBP and one for introduction of HNO$_3$; and an overflow through which the reactor effluent flowed. The comparative run without inhibitor was made by starting with a stirred empty reactor and then simultaneously beginning the flow of 70% HNO$_3$ at a rate of 15.02 ml./min. and the flow rate of neat OSBP at a rate of 9.88 ml./min. The reaction temperature reached 65° C. and was maintained at 65±1° C. At 119 minutes a small sample of the organic layer effluent was removed and washed by injection into a large volume of water. The water was extracted with methylene chloride and dried over Na$_2$SO$_4$. Analysis by gas-liquid chromatography indicated that the product contained 91.37 mole percent DNOSBP and 7.42 mole percent SBQ. In the same manner as the comparative test, an inhibited experiment was conducted by adding 10 mole percent 2-propanol to the OSBP feed. The reaction was started and run as shown above. At 146 min. a sample of the reactor effluent was worked up as shown above. Analysis showed the product contained 95.30 mole percent DNOSBP and 4.25 mole percent SBQ compared to 91.37 mole percent DNOSBP and 7.42 mole percent SBQ for the uninhibited reaction.

EXAMPLE

In Example 24, 20 minutes of reactor effluent in both the comparative experiment and the inhibited experiment were separately diverted to a holding tank. In each case the holding tank was maintained at 55±2° C. for 60 minutes after diversion was terminated. The organic layer was separated from the supernatant aqueous layer and washed three times with 250 ml. water. After stripping the water under aspirator vacuum at steam bath temperature, the products were analyzed by gas-liquid chromatography. The product from the comparative run was analyzed to contain 94.85 mole percent DNOSBP and 5.15 mole percent SBQ, whereas the run inhibited with 10 mole percent 2-propanol contained 96.70 percent DNOSBP and 2.40 mole percent SBQ. The yield of DNOSBP based on the OSBP charged was 88.2 percent for the uninhibited run and 91.5 percent for the run inhibited with 10 mole percent 2-propanol.

In the same manner as described by the examples above, other alkylphenols such as o, m or p-cresol, ethyl-phenol, propylphenol, n-butylphenol, sec-pentylphenol, hexylphenol, decylphenol, 2,6-di-t-butylphenol, 2,4-dimethyl-phenol or 3-methyl-4-butylphenol may be nitrated in the presence of an inhibitor. Also, in the same manner, other inhibitors, such as 2-pentanol, t-amyl alcohol, 3-hexanol, 2-decanol, 2-nitrohexane, pentanal, undecanal, 2-butanone, 2,2-dimethyl-3-butanone, 3-pentanone and 5-nonanone, may be employed in concentrations of up to about 30 mole percent to limit SBQ formation and increase the yield.

We claim:

1. A process for the liquid phase direct nitration of an alkylphenol having one or two alkyl groups of one to about 10 carbon atoms, comprising contacting the alkylphenol with nitric acid having a concentration of from about 20 weight percent to fuming nitric acid, in the presence of an oxidation inhibitor selected from the group consisting of a secondary or tertiary alkanol, a secondary alkyl nitrate, an alkanal, an alkanone or mixture thereof wherein the inhibitor contains up to eight carbon atoms, and wherein the concentration of the inhibitor is about 2 to about 30 mole percent based on the alkylphenol.

2. The process of claim 1 wherein the inhibitor is 2-propanol, 2-butanol, isopropyl nitrate or acetone.

3. The process of claim 1 wherein the inhibitor is 2-propanol.

4. The process of claim 1 wherein the concentration of the inhibitor is 5 to 15 mole percent.

5. The process of claim 1 wherein a monoalkylphenol is reacted.

6. The process of claim 1 wherein the alkyl-phenol has an alkyl group of one to four carbon atoms.

7. The process of claim 1 wherein the alkyl-phenol is o-sec-butylphenol.

8. The process of claim 1 wherein the temperature is about 10° to about 85° C.

* * * * *